US012761097B2

(12) United States Patent
De La Cruz Navarro et al.

(10) Patent No.: US 12,761,097 B2
(45) Date of Patent: Oct. 13, 2026

(54) NON-IMPACT METHODS AND DEVICES FOR TESTING THE RIGIDITY AND/ OR THE STABILITY OF ONE OR MORE LOADS

(71) Applicant: SAFE LOAD TESTING TECHNOLOGIES, S.L., Paterna (ES)

(72) Inventors: Enrique De La Cruz Navarro, Paterna (ES); Manuel Alfredo García-Romeu Martínez, Paterna (ES); Antonio Madrigal Meneses, Paterna (ES); Carlos Orero Canet, Paterna (ES); Carlos Mora Martin, Paterna (ES); Alberto Tellechea Zugarramurdi, Paterna (ES)

(73) Assignee: SAFE LOAD TESTING TECHNOLOGIES, S.L., Paterna (ES)

( * ) Notice: Subject to any disclaimer, the term of this patent is extended or adjusted under 35 U.S.C. 154(b) by 796 days.

(21) Appl. No.: 17/609,263

(22) PCT Filed: May 6, 2020

(86) PCT No.: PCT/EP2020/062612
§ 371 (c)(1),
(2) Date: Nov. 5, 2021

(87) PCT Pub. No.: WO2020/225320
PCT Pub. Date: Nov. 12, 2020

(65) Prior Publication Data

US 2022/0228940 A1 Jul. 21, 2022

(30) Foreign Application Priority Data

May 7, 2019 (EP) .................................... 19382348

(51) Int. Cl.
*G01M 99/00* (2011.01)
*G01M 1/00* (2006.01)

(52) U.S. Cl.
CPC .................................... *G01M 1/00* (2013.01)

(58) Field of Classification Search
CPC .................................................. G01M 99/004
See application file for complete search history.

(56) References Cited

U.S. PATENT DOCUMENTS 4,841,869 A * 6/1989 Takeuchi ................ B61B 13/12 104/140
4,939,440 A * 7/1990 Burke .................... B41J 19/202 318/434
2019/0022453 A1* 1/2019 Buehl ...................... A61H 1/02

OTHER PUBLICATIONS https://vimeo.com/229763162 (Year: 2017).*
(Continued)

*Primary Examiner* — Alexander A Mercado
(74) *Attorney, Agent, or Firm* — Peter B Scull

(57) ABSTRACT

A non-impact method for testing either or both the rigidity and/or the stability of one or more loads placed on a carriage by subjecting the carriage to an acceleration single pulse profile including displacing the carriage in a first direction and accelerating the carriage according to the acceleration single pulse profile such that along part of the acceleration single pulse profile the carriage is displaced in a second direction opposite to the first direction. A device for testing stability and/or rigidity of one or more loads is also provided.

20 Claims, 4 Drawing Sheets

(56) References Cited

OTHER PUBLICATIONS

Cargo securement rules. FMCSA. ( Aug. 19, 2018). https://www.fmcsa.dot.gov/regulations/cargo-securement/cargo-securement-rules (Year: 2018).*
SCE Show Guide 2018 (Year: 2018).*
https://vimeo.com/410816458 (Year: 2020).*
International Search Report and Written Opinion of the International Searching Authority. International Application No. PCT/EP2020/062612 issued by the European Patent Office, mail date Jul. 17, 2020, 12 pages, Rijswijk, Netherlands.
De La Cruz Navarro, Enrique, Stopping Process Effects over Stability Test Results, 21st IAPRI World Conference on Packaging 2018—Packaging: Driving a Sustainable Future—21st IAPRI World Conference on Packaging 2018—Packaging: Driving a Sustainable Future 2019, Jun. 19, 2018, Destech Publications Inc., Lancaster, PA, USA.
EUMOS Standard 40509:2020; © AISBL European Safe Logistics Association, Non-Profit Association devoted to Safer Logistics in Europe; Title: Test Method for Load Unit Rigidity, Review of EUMOS 40509:2012; © EUMOS 2020; Version: 2020 Validity: This standard is valid from Jul. 1, 2020.

* cited by examiner

NON-IMPACT METHODS AND DEVICES FOR TESTING THE RIGIDITY AND/ OR THE STABILITY OF ONE OR MORE LOADS

The present disclosure relates to non-impact methods for testing the rigidity and/or the stability of one or more loads. The present disclosure further relates to devices for testing the rigidity and/or the stability of one or more loads.

BACKGROUND

During transport, numerous forces may act on loads located e.g. in a cargo space of a vehicle. Particularly, the vehicle (and thus the cargo space of such a vehicle with the corresponding loads) may be accelerated and decelerated during transport in different directions. Moreover, vibrations and shocks as well as impacts on the loads can often occur.

As a result, the loads may be displaced or slip during transport. The loads may also be deformed or tilted. In the event of a sudden displacement or deformation of the loads, forces and moments can be exerted by the loads to the vehicle.

Load securing devices such as lashings, steel wire ropes or chains may be fixed between the loads and lashing points on the vehicle structure to secure the loads. Also, specific packaging methods and systems may be used to secure loads e.g. to a pallet. However, the loads may still tend to tilt and/or deform e.g. when such loads are subjected to acceleration or decelerations of the vehicle. In order to verify the rigidity and/or the stability of the loads, various testing methods and machines have been developed.

For example, it is known to perform an acceleration test using an acceleration test machine. A carriage or platform may be situated on a sliding bearing and it can be moved along a horizontal trail. A load, with chosen packaging can be secured in a chosen manner to the carriage. A very high torque servo motor may be used to move this carriage. The carriage can be driven along a pre-defined speed and acceleration profile, so that the acceleration or deceleration to which the load is subjected can be precisely known. The deformation of the load can be measured in detail after the test and also during the test. Different methods for measuring the deformation of the load during or after the test are known. One or more cameras and appropriate image processing systems may be used. By subjecting loads, with varying packaging and/or varying securing methods to the same velocity/acceleration profile, the stability and rigidity of the different loads can be meaningfully quantified and compared. Conclusions may then be drawn as to the effectiveness of certain packaging and securing methods. For example, the EUMOS 40509 standard defines such standardized tests.

The acceleration test machine may be used in different ways: the carriage may be accelerated slowly (e.g. at 0.2 g) up to a certain speed. Then, the speed may be maintained during a short period of time. Subsequently, the carriage may be decelerated with an accurately controlled deceleration (e.g. at 0.5 g) during a prescribed period of time (e.g. 300 milliseconds). Then the platform may be brought to a smooth stop. It is noted that the slow initial acceleration may not deform or move the products in the backward direction. The main load applied during the test is during the braking. During braking, the products can move or deform in the forward direction relative to the carriage.

Alternatively, the carriage may be abruptly accelerated in a controlled way (e.g. at 0.5 g) until a desired speed is achieved. Then, the speed may be maintained during a short period of time. At this point, the carriage may be decelerated slowly (e.g. at 0.2 g).

However, the acceleration test machines are generally quite large, heavy and lengthy in order to reach the prescribed speeds and accelerations.

Examples of the present disclosure seek to provide improved methods and systems for testing loads.

SUMMARY

According to a first aspect, a non-impact method for testing one or both the rigidity and/or the stability of one or more loads placed on a carriage by subjecting the carriage to an acceleration single pulse profile or a corresponding velocity profile is provided. The method includes: displacing the carriage in a first direction. And the method further includes: accelerating the carriage according to the acceleration profile such that along part of the acceleration single pulse profile the carriage is displaced in a second direction opposite to the first direction.

According to this first aspect, a non-impact method for testing and quantifying the rigidity and/or the stability of one or more loads placed on a carriage is provided in which such rigidity and/or stability of the loads is tested by accelerating the carriage following a specific acceleration profile. The test thus simulates horizontal inertia forces similar to the ones occurring during transport, especially road and rail transport.

In this respect, the acceleration single pulse profile (or the velocity profile) provides a displacement of the carriage in a first direction and in a second direction opposite to the first direction. Particularly, the acceleration profile (or the velocity profile) is applied during the test to the carriage such that the carriage is displaced in the first direction (during one part of the test) and in the second direction opposite to the first direction (during another part of the test). As a result the test can be carried out in a relatively reduced space (as compared e.g. to the known acceleration tests which are performed in a single direction and thus require a long space to perform the test). Moreover, the maximum speed reached during the test is relatively small (as again compared to the speed reached in these known acceleration tests). Less powerful motors (with less energy consumption) may thus be used to perform such test.

It is noted that the present description and claims refer to a method for testing the rigidity and/or the stability of one or more loads placed on a carriage according to the EUMOS 40509 standard, the carriage being displaced in the first direction (during one part of the test) and in a second direction opposite to the first direction (during another part of the test).

According to a second aspect, a device for testing stability and/rigidity of one or more loads is provided. The device includes a carriage for supporting the loads. The device further includes a drive for moving the carriage along a guide, the device being configured to carry out a method according to the first aspect.

According to this aspect, the carriage supporting the loads is displaced in a first direction and in a second direction (opposite to the first direction) following a specific acceleration profile or velocity profile, during the test. The device for testing stability and/rigidity may thus be designed relatively small and lightweight (as compared to known acceleration test machines). It is noted that this is critical in facilities housing the test devices, where the space is an issue.

In summary, a device for testing one or more of stability and/or rigidity of loads that is efficient, cost-effective (particularly in terms of material, transport and installation) and/or versatile and/or that can be used effectively with all kind of tests for testing stability and/or rigidity of loads is provided.

DESCRIPTION OF THE DRAWINGS

Non-limiting examples of the present disclosure will be described in the following, with reference to the appended drawings, in which.

DETAILED DESCRIPTION

Throughout the present description and claims, the term "load" is used to refer to an indivisible piece of cargo. The "load" may be protected and/or fixed and secured within e.g. one single transport package. The "load" may include any dimensions, material, surface conditions, etc. . . . . Moreover, in examples, the "load" may be situated on a pallet, with specific dimensions and mass and with a specific stacking pattern and stacking order. The "load" may also include elements which may influence load rigidity such as interlayer sheets, glue, wrapping, corner protection and so forth.

Throughout the present description and claims, the term "rigidity" is used to refer to the deformation and relative movements of parts of a load when e.g. the load is subjected to a acceleration in a certain direction. Particularly, when the load is subjected to a acceleration in a certain direction and the movements of the load are smaller than an acceptable upper limit, the load is considered relatively stiff. It is noted that the "rigidity" of a load may depend on several parameters such as the product type, the primary packaging, the secondary packaging, the stacking pattern, the transport packaging and so forth.

Throughout the present description and claims, the term "acceleration single pulse profile" is used to refer to a transient change in an acceleration value applied to a carriage forming part of a device for testing stability and/or rigidity of loads from a baseline acceleration value to a higher or lower acceleration value, followed to a return to the baseline acceleration value.

Throughout the present description and claims, the term "velocity profile" is used to refer to a speed curve (as a function of time) applied to a carriage forming part of a device for testing stability and/or rigidity of loads which may correspond to the "acceleration single pulse profile" applied to such carriage.

Throughout the present description and claims, the term "non-impact method for testing . . . " is used to refer to a form of test in which the stability and/or the rigidity of one or more loads can be tested displacing a carriage in a first direction wherein the carriage does not impact with an element situated along the track over which the carriage is displaced, during its displacement in such first direction, contrary to the "crash tests" in which the carriage is displaced in a first direction over a track and the carriage impacts with an element situated over the track e.g. at or near an end of the track.

Throughout the present disclosure, the terms "non-impact method for testing . . . " and "method for non-destructive testing . . . " are used interchangeably.

Figure 1:
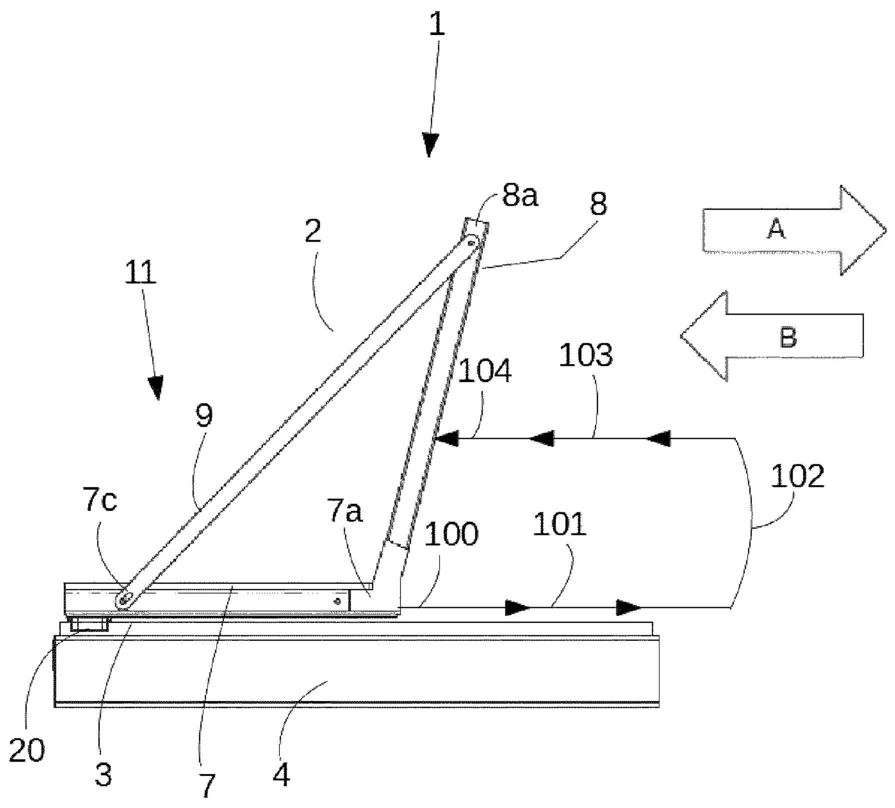
FIG. 1 schematically illustrates an example of a device for testing one or both stability and/or rigidity of one or more loads.

FIG. 1 schematically illustrates an example of a device for testing stability and/or rigidity of one or more loads. FIG. 1 schematically illustrates a cross-sectional partial view of the device for testing stability and/or rigidity of one or more loads. In this example, a carriage 2 is provided. The carriage 2 is partially shown in FIG. 1. The carriage 2 may include a base 7. The base 7 in this example may be a substantially square flat base. However, other shapes of the base 7 are possible e.g. substantially circular-shaped or rectangular-shaped. The base 7 extends from a first end 7*a* to a second end (not shown). It is noted that the base may be provided with a suitable friction to prevent, in use, sliding of e.g. a load to be tested relative to the base during acceleration/deceleration of the carriage 2 e.g. up to a given acceleration limit.

The carriage 2 may be provided with a first rail guide 20 and a further rail guide (not visible). In some other examples not shown, the first end 7*a* may be provided with the first rail guide located at or near a first corner of the first end 7*a*. Additionally, the second rail guide may be provided at or near a corner opposite to the first corner of the first end 7*a*. Similarly, a third rail guide (not shown) and a fourth rail guide (not shown) may be provided at the second end. In examples, the carriage 2 may be provided with a different number of rail guides e.g. six rail guides and the rail guides may be located in some other locations along a bottom part of the base 7. The rail guides may be integrally formed with or attached to the carriage 2.

Following the example, the carriage 2 may be provided with a front wall 8 and a rear wall (not shown). The front wall 8 may be integrally formed with or coupled to the first end 7*a* of the base 7. Similarly, the rear wall (not shown) may be integrally formed with or coupled to the second end (not shown) of the base. In any case, the walls may be tilted at different angles with respect to the plane defined by the base 7 in order to prevent an excessive tilting of the loads during the test. For example, each wall 8 may be arranged with respect to the plane defined by the base at an angle of at least 14 degrees. As a result, in use, a gap may be created between the load to be tested and the walls that allow a certain deformation of the load to be tested during the test.

The walls may be of constant height as shown in this example (see wall 8). In some other examples not shown, the walls may include portions and the portions may be of varying height.

The size of the carriage (particularly the walls and the base) may be adjusted in accordance with its objective, and can thus be varied for different types of test for checking the stability and/or the rigidity of a load.

The carriage 2 may further include a one or more security bars. In this view of the device 1, a single security bar 9 is visible. The security bars may be a substantially hollow beam and may include e.g. a substantially rectangular cross-section having four connected sidewalls although other cross-sectional shapes are possible e.g. a substantially square or rounded cross-section. In some other examples, the security bars may be flat bars. In the example, the security bar 9 may be removably situated between a distal end 8*a* of the wall 8 and a portion 7*c* of the base 7. Further security bars, if any, may be arranged in a substantially similar way between the corresponding wall and the base. In some other examples not shown, each security bar may be arranged between a distal end of the corresponding wall and a portion of a further opposite wall (not shown). In any case, the function of the securing bars is to avoid a possible fall of the load(s) to be tested from carriage during a test for checking the rigidity and/or stability of a load.

As a result of this carriage 2 arrangement, an interior space 11 of the carriage 2 suitable to receive a load to be tested may be formed between the walls 8, the security bars 9 and the base 7.

Following the example, a first guide rail 3 and a second guide rail (not visible) may be provided. The rails may be aligned parallel to each other in a U-shaped cross-section. The rails 3 may further be arranged in a substantially horizontal way with respect to a support 4.

In use, the carriage 2 may be mounted in the first rail 3 and the second rail (not visible). Particularly, the above-described rail guides 20 of the carriage may be situated over the corresponding rail such that the carriage 2 may be displaced with respect to the support 4 in a first direction (see arrow A) and in a second direction opposite to the first direction (see arrow B).

The carriage 2 may be driven using a suitable drive mechanism. E.g. suitable motors, pneumatic or hydraulic units may be used to deliver sufficient power to a drive mechanism that may include e.g. a piston, a rack and pinion mechanism, an endless belt etc.

In use, one or more loads (not shown) to be tested may be located in the interior space 11 of the carriage 2. Each load may be packaged using the selected transport packaging. The objective of the packaging is to prevent deformation or relative movement of pieces forming part of the load resulting in an elastic or even permanent deformation of the load itself.

The loads may be arranged and fixed to the carriage 2 with corresponding load securing elements suitable for the test to be performed. Particularly, load securing elements (not shown) e.g. lashings, steel wire ropes or chains may be employed between the loads to be tested and lashing points on the carriage 2. In case of heavy loads to be tested, e.g. four different load securing elements may be used. However, in case the loads to be tested correspond to palletized goods, one lasing device for each direction of movement of the carriage 2 may be used e.g. to compensate for the forces during braking and/or acceleration. In summary, by securing the loads to the carriage 2, the loads may ideally be prevented to slide, tilt, or to be deformed during the performance of the test. In this respect, the load securing elements may simulate the securing elements used in a real transport.

Additionally, the base 7 and/or the walls 8 may be provided with one or more sensors (not shown). The sensors may be configured to measure the forces exerted, in use, by the loads to be tested on the base 7 and the wall 8 during the test for checking the stability and/or the rigidity of a load, as will be described later on. Particularly, the sensed forces may be recorded and provided for subsequent evaluation. The system 1 may further be provided with cameras e.g. high-speed cameras. This way, the behavior of the load(s) to be tested may be recorded during the performance of the test (and subsequently analyzed). Cameras might be fixed to the carriage but might also be static.

In accordance with an aspect, the rigidity and/or the stability of loads can be tested substantially as follows:

A device for testing the rigidity and/or the stability of one or more loads as hereinbefore described may be provided. The device is configured to apply horizontal inertia forces as occurs during transport, especially road and rail transport. The test may thus be particularly relevant to simulate deformations of the load related to road and rail transports.

In this example, a load (not shown) may be located in the interior space 11 formed between the base, the walls and the securing bars. It is noted that, at the start of the test, the load may be located in the interior space 11 such that the load does not touch either the front wall 8 or the rear wall (not shown). The load may be packed with a chosen packaging. The packaging of the load preferably is undamaged at the start of the test to quantify the effectiveness of such packaging to prevent deformation or relative moment of pieces forming part of the load resulting in an elastic or even permanent deformation of the load itself.

The load may be situated in such interior space 11 over the base 7 with a horizontal distance between a first end 7_a_ of the base 7 and the load to be tested of at least 6 centimetres. The load may also be secured to the carriage as hereinbefore described to simulate the securing methods used in a real transport.

A possible test performance may be substantially as follows:

At a first stage 100, the carriage may be slowly accelerated (at an acceleration between 0.2 and 0.3 g, in some instances specifically 0.266 g) and displaced in a first direction (arrow A) until a first speed is reached. It is noted that the slow initial acceleration would typically be chosen low enough so as not to deform or move the loads to be tested in the backward direction i.e. a second direction (arrow B) opposite to the first direction (arrow A). At this first stage, the carriage may be slowly accelerated during a period of time between 0.5 and 0.6 seconds, in some instances specifically 0.525 seconds. Moreover, the first speed reached may be between 1.3 m/s and 1.4 m/s, in some instances, specifically 1.373 m/s. As a result, at this stage, the carriage may be displaced in the first direction (see arrow A) between 0.3 and 0.4 meters, in some instances specifically 0.36 meters.

Once the above-described first speed is reached, at a second stage 101, the carriage 2 is further displaced in the first direction (arrow A) with the same speed (acceleration 0 g) during a period of time of time between 0.2 and 0.5 seconds. As a result, the carriage 2 is displaced between 0.2 meters and 0.3 meters, in some instances specifically 0.27 meters in such first direction.

At a third stage 102, the carriage 2 is abruptly decelerated, following an acceleration profile e.g. an acceleration single pulse profile, with e.g. 0.8 g. The acceleration continues until the carriage has achieved a speed in the second direction. For an instant, therefore, after 0.17 seconds of deceleration the platform has a speed of 0 m/s and thus effectively came to a standstill. The deceleration however is continued.

The carriage 2 may thus be displaced between 0.1 meters and 0.15 meters during a first part of the third stage 102 until the carriage momentarily comes to a halt. It is noted that, contrary to known crash methods e.g. "horizontal crash tests" or "horizontal shock tests", the carriage may be displaced, during the test, a distance in the first direction which is less than the distance defined by a length of the track over which the carriage is displaced. The carriage may thus not reach an end of the track over which the carriage is displaced. So the carriage shouldn't impact at the end of the track, contrary to the known crash methods, wherein the carriage impacts with an element at or near the end of the track.

Still at the third stage 102 and keeping the acceleration, the carriage continues its acceleration (e.g. at 0.8 g) in a second direction (see arrow B) opposite to the first direction (see arrow A), following the acceleration profile, until a second speed (e.g. a speed between 1.3 m/s and 1.4 m/s, in some instances specifically 1.37 m/s) is reached.

It is noted that, in this example, the acceleration profile may be e.g. a trapezoidal acceleration waveform. The trapezoidal acceleration waveform may be defined including a first slope including a continuous increase of the acceleration from an initial acceleration (e.g. the acceleration of 0 g applied in the stage 101 to the carriage) to a maximum acceleration (e.g. 0.8 g) during a first period of time (e.g. a very short period of time of 0.0001 seconds), a flat top portion including maintaining the maximum acceleration (e.g. 0.8 g) during a second period of time (e.g. between 0.3 and 0.4 seconds) and a second slope including a continuous deceleration from the maximum acceleration (e.g. 0.8 g) to the initial acceleration (e.g. 0 g) during a third period of time. This particular example will be explained later on with reference to FIG. 2*c*.

In some other examples, the acceleration profile may be e.g. a triangular acceleration waveform defined by a first slope including a continuous acceleration from an initial acceleration (e.g. 0 g) to a maximum acceleration (e.g. 0.8 g) during a first period of time (e.g. 0.2 seconds) and a second slope including a continuous deceleration from the maximum acceleration (e.g. 0.8 g) to the initial acceleration (0 g) during a second period of time (e.g. 0.2 seconds) starting at the end of the first period of time.

In further examples, the acceleration profile may be e.g. a half-sine acceleration waveform. The half-sine acceleration waveform may be defined by an acceleration profile which sinusoidally rises from an initial acceleration (e.g. an acceleration of 0 g) to a maximum acceleration (e.g. an acceleration of 0.8 g) during a first period of time and sinusoidally drops from the maximum acceleration to the initial acceleration. The half-sine acceleration waveform may be calculated by applying the following equation:

$$a(t) = A\sin(wt + \varphi)$$

wherein a is the acceleration of the carriage, A is amplitude, w is the angular frequency, t is the time and φ is the phase difference.

As a result of the acceleration (during the stretch 102) the load can deform or slide in the first direction (now backwards direction) (see arrow A) starting. The carriage may be abruptly accelerated during a period of time between 0.1 seconds and 0.2 seconds, in some instances specifically 0.17 seconds to reach the same speed in the second direction as it had in the first direction.

In examples, the first speed i.e. the speed at which the carriage starts the third stage 102 and the second speed i.e. the speed at which the carriage ends the third stage 102 may be the same. It is noted that the first speed and the second speed reached by the carriage in the current test may be half of the maximum speed reached during known acceleration tests.

Following the example, after the abrupt acceleration of the carriage until the second speed is reached, at a fourth stage 103, the carriage 2 is further displaced in the second direction (arrow B) with the same second speed (between 1.3 m/s and 1.4 m/s, in some instances specifically 1.37 m/s and an acceleration of 0 g) during a period of time between 0.2 and 0.5 seconds. As a result, the carriage is displaced between 0.2 meters and 0.3 meters, in some instances specifically 0.27 meters in such second direction during the fourth stage 103.

After the above-commented period of time of the fourth stage, at a fifth stage 104, the platform may be slowly decelerated until the platform is stopped. The carriage may be slowly decelerated during a period of time between 0.5 and 0.6 seconds, in some instances specifically 0.525 seconds. The deceleration employed may be between 0.2 and 0.3 g, in some instances specifically 0.266 g. It is noted that the slow final deceleration may not deform or move further the loads to be tested in the second (forward) direction (see arrow B).

The carriage 2 is stopped at or near the same position wherein the carriage 2 started its displacement at the stage 100 (contrary to the known test acceleration machines which are stopped at a position further away from the initial starting position since the displacement of the carriage during the test is performed in a single direction).

In summary, the total displacement of the carriage 2 in the first direction during the test may be e.g. between 0.7 meters and 1.1 meters, in some instances specifically 0.76 meters. Similarly, the displacement of the carriage in the second direction may also be e.g. between 0.7 and 1.1 meters, in some instances specifically 0.76 meters. The length of the device to perform the test may also be in this range or a bit longer, with a small security factor.

It should be clear that other (standardized) tests could be performed, choosing e.g. a different acceleration or speed profile or displacement profile, and particularly a different maximum acceleration/deceleration. Also the precise timings of the various stages may be varied.

In this example, the total displacement of the carriage in the first direction may be the same as the total displacement of the carriage in the second direction (opposite to the first direction) i.e. in this example, 50% of the total displacement of the carriage is performed in the first direction and another 50% of the total displacement of the carriage is performed in the second direction. Moreover the maximum speed reached during the test may be between 1.3 m/s and 1.4 m/s. As described above, this speed may be half of the maximum speed reached in the known acceleration test according to e.g. EUMOS standard in which the carriage is displaced in a single direction.

In some other examples, the carriage may be displaced 60% of the total displacement of the carriage in the first direction (a displacement between 1.3 and 1.4 meters) and 40% of the total displacement of the carriage in the second direction. In this example, the maximum speed reached may be between 1.6 and 1.7 m/s.

The carriage may also be displaced 70% in the first direction and 30% in the second direction (total displacement in the first direction between 1.7 and 1.8 meters and maximum speed between 1.9 and 2 m/s), 80% in the first direction and 20 in the second direction (total displacement in the first direction between 2.1 and 2.2 meters and maximum speed between 2.1 and 2.2 m/s) and 90% in the first direction and 10% in the second direction (total displacement in the first direction between 2.4 meters and 2.6 meters and maximum speed between 2.4 and 2.5 m/s). In all these examples, the displacement of carriage in the first direction (and thus the length of the path over which the carriage is displaced) is still less than the displacement of the carriage in the known test acceleration methods wherein the carriage is displaced in a single direction. The maximum speed reached during the test is also less than the maximum speed reached in the known acceleration test. The same advantages as hereinbefore describe thus still apply to these examples.

The elastic or the permanent deformation of the tested load may be measured during and/or after the test. The deformation may be compared to an upper deformation limit. If the measured deformation is less that the upper limit, the load is considered stiff up to the maximum acceleration applied during the test (e.g. 0.8 g) in the direction(s) of movement of the carriage. Unacceptable deformation may be defined as a movement and/or displacement of the load before and after the test measured in any horizontal plane which is smaller than 6 cm and, in case of palletized loads, smaller than 45% of the height of the pallet.

It is noted that the elastic and permanent deformation of the test load may also be less than four upper limits as defined in the EUMOS 40509 standard which defines such standardized tests for pallet loads.

Figure 2A:
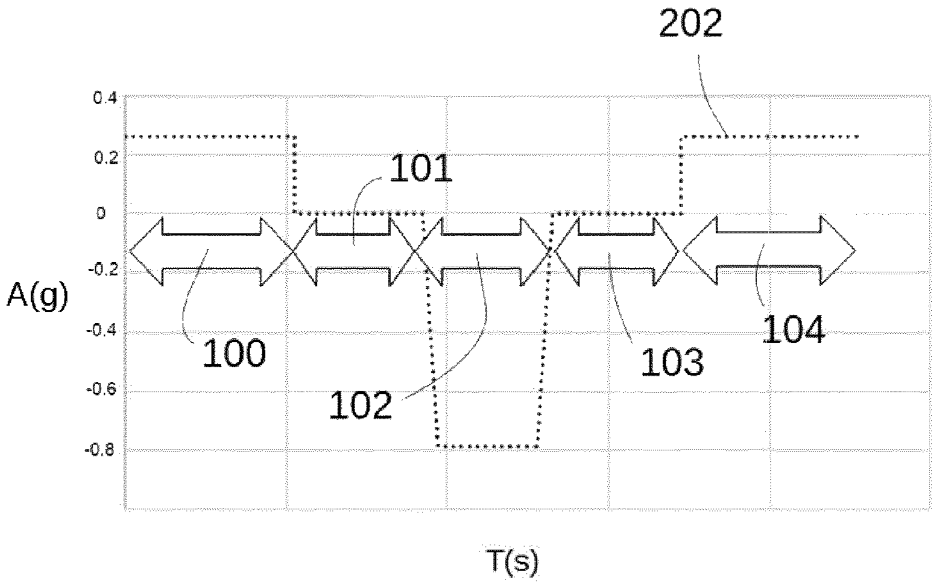
FIGS. 2*a*-2*c* illustrate an acceleration curve, a speed curve and a displacement curve respectively of a device for testing stability and/or rigidity of one or more loads, as a function of time according to an example.
Figure 2B:
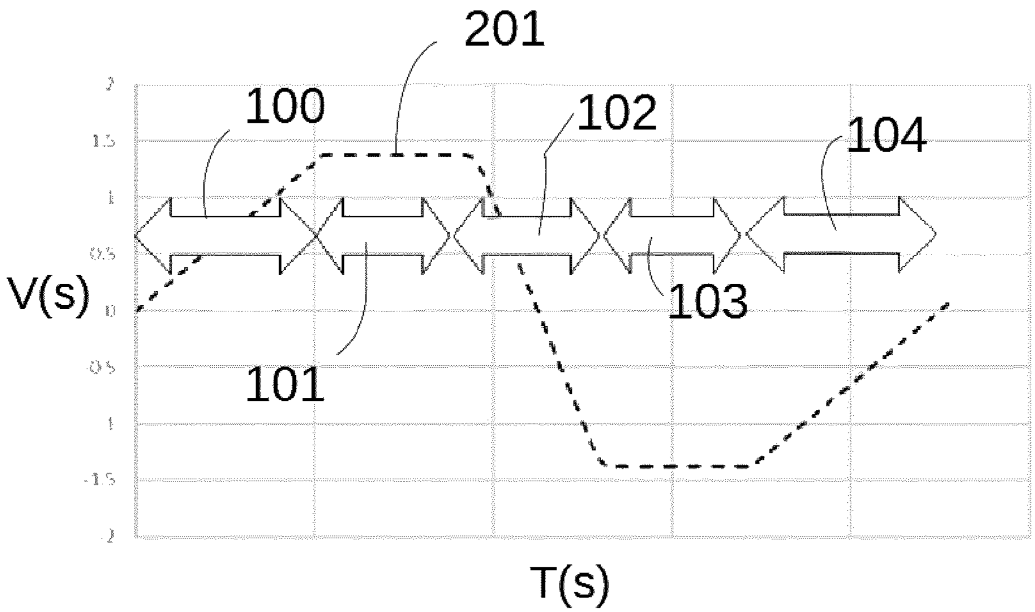
Figure 2C:
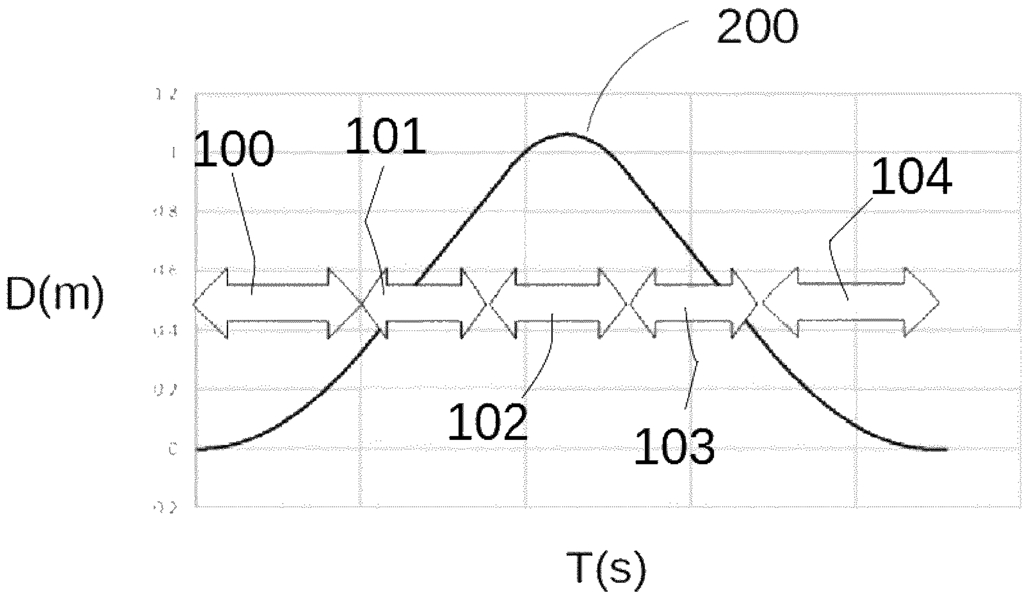

FIGS. 2*a*-2*c* illustrate an acceleration curve, a speed curve and a displacement curve respectively of a device for testing stability and/or rigidity of one or more loads, as a function of time according to an example. The device for testing the rigidity and/or the stability of one or more loads may be the same or similar to the one shown in FIG. 1. The rigidity and/or the stability of the loads may be tested with a test which may be the same or similar to the one described with reference to FIG. 1. It is noted that the acceleration test applied in all the FIGS. 2*a*-2*c* is the same test.

In FIG. 2*a*, the operation of a device for testing stability and/or rigidity of one or more loads is illustrated in terms of acceleration (g), as a function of time (t), following the curve 202. The curve 202 shows an initial acceleration of the carriage of approximately 0.26 g during a first stage 100 wherein a slow acceleration is applied of the carriage. At the second stage 101, the acceleration may be 0 g. The curve 202 also shows a deceleration of approximately 0.8 g during a further stage 102 wherein an abrupt deceleration is applied to the carriage. The curve 202 during this stage 102 defines an "acceleration single pulse profile" since the acceleration value applied to the carriage may be varied from a baseline acceleration value (0 g) to a lower acceleration value (−0.8 g), followed to a return to the baseline acceleration value (0 g). Moreover, the curve 202 shows a deceleration of approximately 0.26 g during the last stage 104 wherein a slow deceleration is applied to the carriage until the carriage is stopped.

In FIG. 2*b*, the operation of a device for testing stability and/or rigidity of loads is illustrated in terms of speed (m/s), as a function of time (s), following the curve 201. The curve 201 shows a speed of the carriage forming part of the device for testing stability and/or rigidity of one or more loads between approximately +1.4 m/s and −1.4 m/s. Particularly, during a first stage 100, the carriage may be accelerated such that the carriage reaches a maximum speed of 1.4 m/s. This speed may be maintained during a second stage 101. Then, at a third stage 102, the carriage may be decelerated such that the carriage reaches a speed of −1.4 m/s. The speed of −1.4 m/s may be maintained during a fourth stage 103 of the carriage. Finally, the carriage is stopped (speed 0 m/s) at the fifth stage 104.

The maximum speed of 1.4 m/s is achieved by the carriage during its displacement in the first direction. The maximum speed of −1.4 m/s is achieved by the carriage during its displacement in the second direction (opposite to the first direction). As commented above, this speed (in absolute terms) may be approximately half of the maximum speed reached in the known acceleration test in which the carriage is displaced in a single direction.

In FIG. 2*c*, the operation of a device for testing stability and/or rigidity of one or more loads is illustrated in terms of displacement (m), as a function of time (s), following the curve 200. The curve 200 shows a displacement of the carriage around 1.1 meters in the first direction. Particularly, the carriage is displaced around 0.3 meters during a first stage 100, around 0.5 meters in a second stage 101 and 0.3 meters in (a first part of) a third stage 102 in the first direction. Once the carriage has been displaced approximately 1.1 meters in the first direction, the carriage is displaced in a second direction (opposite to the first direction) until an initial position is reached again (0 meters). Particularly, the carriage is displaced 0.3 meters in (a second part of) the third stage 102, 0.5 meters in the fourth stage 103 and 0.3 meters in the fifth stage 104. It is thus clear that the maximum displacement of the carriage, during the test, may be 1.1 meters and thus the length of the device to perform the test may also be in this range.

Figure 3A:
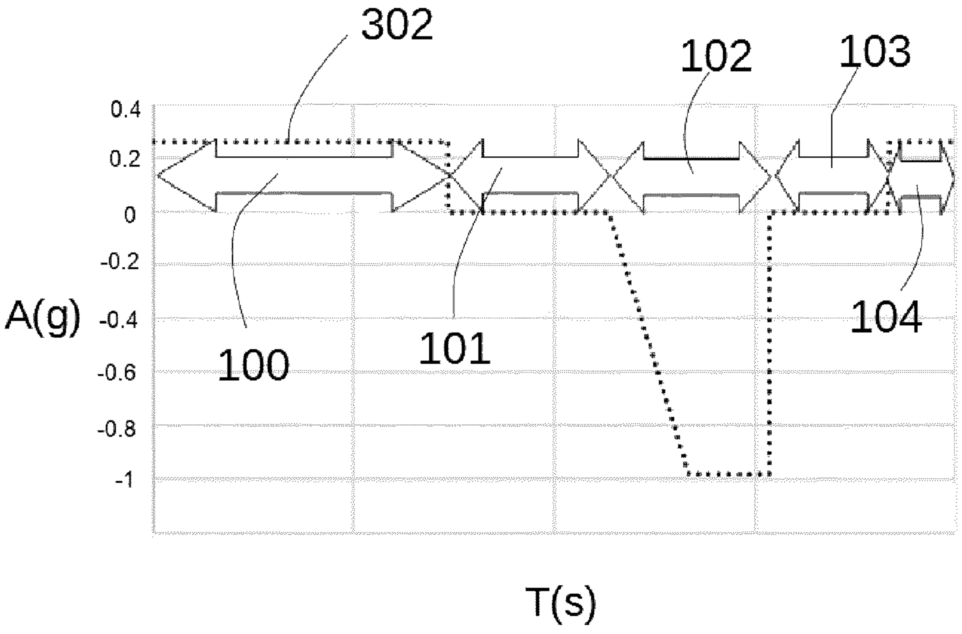
FIGS. 3*a*-3*c* illustrate an acceleration curve, a speed curve and a displacement curve respectively of a device for testing stability and/or rigidity of one or more loads, as a function of time according to another example.
Figure 3B:
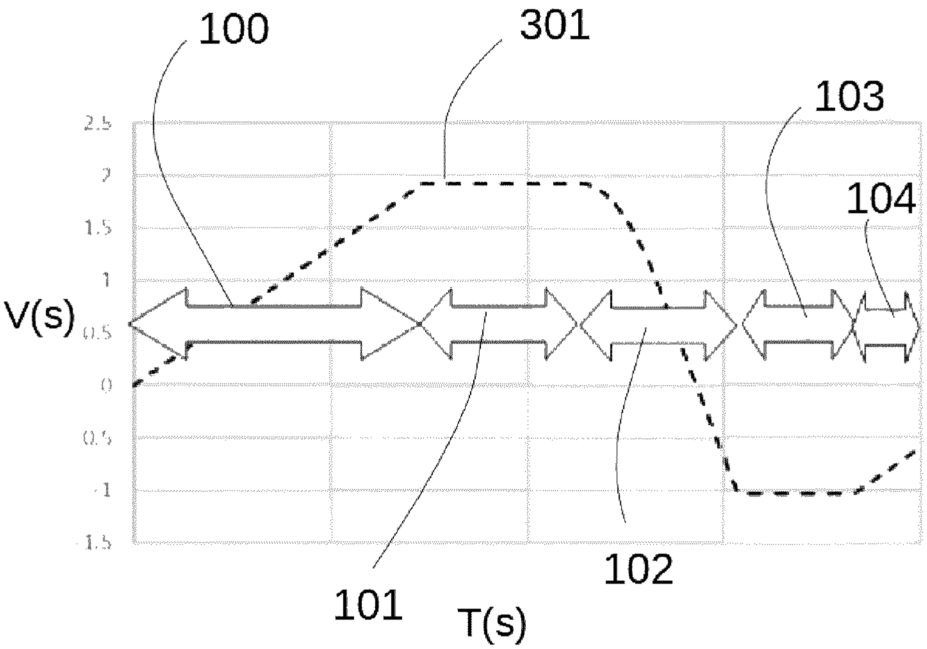
Figure 3C:
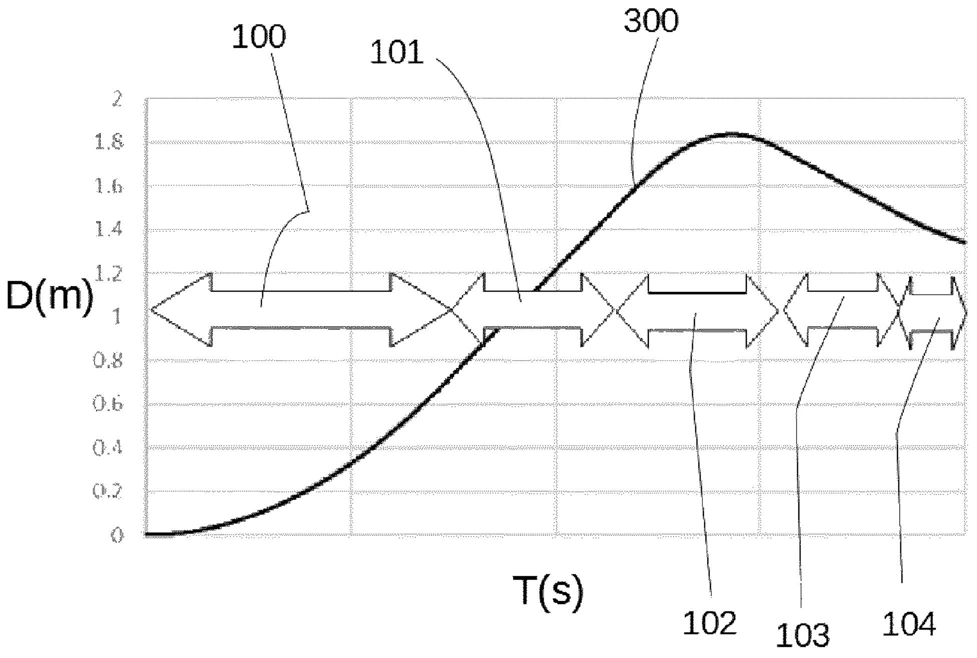

FIGS. 3*a*-3*c* illustrate an acceleration curve, a speed curve and a displacement curve respectively of a device for testing rigidity and/or stability of one or more loads, as a function of time according to another example. The device for testing the rigidity and/or the stability of one or more loads may be the same or similar to the one shown in FIG. 1. However, the rigidity and/or the stability of the loads may be tested with a test which is slightly different from the one described with reference to FIGS. 2*a*-2*c* but still included in the examples described with reference to FIG. 1. Particularly, in this example, the carriage may be displaced approximately 70% of the total displacement in the first direction and approximately 30% of the total displacement of the carriage in the second direction.

In FIG. 3*a*, the operation of a device for testing stability and/or rigidity of one or more loads is illustrated in terms of acceleration (g), as a function of time (t), following the curve 302. The curve 302 shows an initial acceleration of the carriage of approximately 0.22 g during a first stage 100. At a second stage 101, the acceleration may be 0 g. The curve 302 also shows a deceleration of approximately 1 g during a further stage 102 wherein an abrupt deceleration is applied to the carriage. Similarly as before, the curve 302 during this stage 102 defines an "acceleration single pulse profile". At a further stage 103, the acceleration is removed (acceleration 0 g). Moreover, the curve 202 shows a deceleration of approximately 0.22 g during the last stage 104.

FIG. 3*b* illustrates a speed curve of a device for testing stability and/or rigidity of one or more loads is illustrated in terms of speed (m/s), as a function of time (s), following the curve 301. The curve 301 shows a speed of the carriage forming part of the device for testing stability and/or rigidity of one or more loads between approximately +1.9 m/s and −1 m/s. The speed of 1.9 m/s is achieved by the carriage during its displacement in the first direction. The speed of −1 m/s is achieved by the carriage during its displacement in the second direction (opposite to the first direction).

Particularly, in a first stage 100, the carriage may reach a speed of approximately +1.9 m/s. Ata second stage 101, the speed of the carriage may be maintained. Ata third stage 102, the carriage may be decelerated until a speed of −1 m/s is reached. At the fourth stage 103, the speed of the carriage may be maintained. Finally, at the last stage 104, the carriage is decelerated and thus the speed is reduced until the carriage is stopped.

In FIG. 3*c*, the operation of a device for testing stability and/or rigidity of one or more loads is illustrated in terms of displacement (m), as a function of time (s), following the curve 300. The curve 300 shows a displacement of the carriage around 1.8 meters in the first direction. Particularly, at a first stage 100, the carriage may be displaced approximately 0.8 meters in the first direction. In a second stage 101, the carriage may further be displaced 0.4 meters. In a (first part of) a third stage 102, the carriage may be displaced around 0.6 meters.

Once the carriage has been displaced around 1.8 meters in the first direction, the carriage is displaced in a second direction (opposite to the first direction) 0.4 meters. For example, the carriage may be displaced, in (a second part of) the third stage 102 around 0.1 meters. Then, the carriage may be displaced, in a fourth stage 103, approximately 0.2 meters. In the last stage 104, the carriage may be displaced around 0.1 meters. It is thus clear that the maximum displacement of the carriage, during the test, may be between 1.7 and 1.85 meters and thus the length of the device to perform the test may also be in this range or a little bit longer.

Although only a number of particular examples have been disclosed herein, it will be understood by those skilled in the art that other alternative embodiments and/or uses and obvious modifications and equivalents thereof are possible. Furthermore, the various examples disclosed herein van be combined. The scope of the present disclosure should not be limited by any of the particular embodiments disclosed, but should be determined only by a fair reading of the claims that follow.

The invention claimed is:

1. A non-impact method for testing one or more cargo loads placed on a carriage by subjecting, within a single test, the carriage to an acceleration single pulse profile or a corresponding velocity profile, the testing comprising:

displacing the carriage at a first speed in a first direction, applying the acceleration single pulse profile to the carriage as the carriage is displacing in the first direction at the first speed, whereby the carriage is accelerated in a second direction, the second direction being opposite to the first direction, the acceleration of the carriage in the second direction occurring until the carriage is being displaced at a second speed in the second direction, to simulate horizontal inertial forces as experienced by the one or more cargo loads during transport, and measuring a deformation of the one or more cargo loads caused by the inertial forces experienced by the one or more cargo loads.

2. A non-impact method according to claim 1, the acceleration single pulse profile being a trapezoidal acceleration profile defined by a first slope comprising a continuous acceleration of the carriage from an initial acceleration to a maximum acceleration during a first period of time, a flat top portion comprising maintaining the maximum acceleration of carriage during a second period of time and a second slope comprising a continuous deceleration of the carriage from the maximum acceleration to the initial acceleration during a third period of time.

3. A non-impact method according to claim 1, the acceleration single pulse profile being defined by a first slope comprising a continuous acceleration of the carriage from an initial acceleration to a maximum acceleration during a first period of time and a second slope comprising a continuous deceleration of the carriage from the maximum acceleration to the initial acceleration during a second period of time, the end of the first period of time and the beginning of the second period of time being the same.

4. A non-impact method according to claim 1, the acceleration single pulse profile being defined by an acceleration of the carriage which sinusoidally rises from an initial acceleration to a maximum acceleration during a first period of time and sinusoidally drops from the maximum acceleration to the initial acceleration.

5. A non-impact method according to claim 1, including displacing the carriage in the first direction at the first speed, and the acceleration single pulse profile accelerating the carriage in the second direction opposite to the first direction providing for the carriage one or both coming to a stop or the speed of the carriage becoming zero, before the end of the acceleration single pulse profile.

6. A non-impact method according to claim 1, the first speed and the second speed being the same speed.

7. A non-impact method according to claim 1, the accelerating the carriage according to the acceleration single pulse profile comprising:

decelerating the carriage during a deceleration period of time in the first direction until the carriage one or both comes to a stop or the speed of the carriage becomes zero, and accelerating the carriage during an acceleration period of time in the second direction, until the second speed is reached.

8. A non-impact method according to claim 7, the acceleration period of time and the deceleration period of time being the same.

9. A non-impact method according to claim 7, the deceleration period of time and the acceleration period of time being one or both between 0.17 seconds and 0.18 seconds.

10. A non-impact method according to claim 9, the deceleration period of time and the acceleration period of time being about 0.175 seconds.

11. A non-impact method according to claim 1, the first speed being one or both between 1.3 m/s and 1.4 m/s.

12. A non-impact method according to claim 11, the first speed being about 1.37 m/s.

13. A non-impact method according to claim 1, including accelerating the carriage according to the acceleration single pulse profile at 0.8 g.

14. A non-impact method according to claim 1, further comprising:

before displacing the carriage in the first direction at the first speed, accelerating the carriage at a rate between 0.2 g and 0.3 g until the first speed is reached.

15. A non-impact method according to claim 14, the carriage being accelerated during a period of time between 0.5 and 0.6 seconds.

16. A non-impact method according to claim 1, including:

a total displacement of the carriage in the first direction less than a length of a track over which the carriage is displaced.

17. A non-impact method according to claim 16, the total displacement of the carriage in the first direction between 1.1 meters and 0.76 meters and the length of the path being between 1.2 meters and 2 meters.

18. A non-impact method according to claim 1, further comprising:

measuring the deformation of the cargo loads; and comparing the deformation of the cargo loads to an upper deformation limit.

19. A non-impact method for simulating forces acting on one or more cargo loads during transport, within a single test, comprising:

placing the one or more cargo loads on a carriage, displacing the carriage in a first direction at a first speed, and applying an acceleration single pulse profile to the carriage as the carriage is displacing in the first direction at the first speed, whereby the carriage is accelerated in a second direction, the second direction being opposite to the first direction, the acceleration of the carriage in the second direction occurring until the carriage is being displaced at a second speed in the second direction, the accelerating in the second direction defining the simulating of inertial forces acting on the one or more cargo loads;

measuring a deformation of the one or more cargo loads caused by the inertial forces experienced by the one or more cargo loads.

20. A non-impact method according to claim 19, including displacing the carriage in the first direction at the first speed, and the acceleration single pulse profile accelerating the carriage in the second direction opposite to the first direction providing for the carriage one or both coming to a stop or the speed of the carriage becoming zero before the end of the acceleration single pulse profile.

* * * * *